United States Patent
Sun

(10) Patent No.: US 8,438,535 B2
(45) Date of Patent: May 7, 2013

(54) METHOD AND APPARATUS FOR PERSISTENT OBJECT TOOL

(75) Inventor: Yawei Sun, Shanghai (CN)

(73) Assignee: SAP AG, Walldorf (DE)

( * ) Notice: Subject to any disclaimer, the term of this patent is extended or adjusted under 35 U.S.C. 154(b) by 1339 days.

(21) Appl. No.: 11/633,851

(22) Filed: Dec. 4, 2006

(65) Prior Publication Data

US 2008/0134217 A1    Jun. 5, 2008

(51) Int. Cl.
*G06F 9/44* (2006.01)

(52) U.S. Cl.
USPC ............................. 717/106; 717/116

(58) Field of Classification Search .................. None
See application file for complete search history.

(56) References Cited

U.S. PATENT DOCUMENTS

| | | | | |
|---|---|---|---|---|
| 5,729,739 A * | 3/1998 | Cantin et al. | ............................. | 1/1 |
| 5,848,419 A * | 12/1998 | Hapner et al. | ........................... | 1/1 |
| 5,878,411 A * | 3/1999 | Burroughs et al. | ............. | 717/106 |
| 6,269,373 B1 * | 7/2001 | Apte et al. | ............................. | 1/1 |
| 6,275,828 B1 * | 8/2001 | Lee et al. | ......................... | 717/116 |
| 6,305,009 B1 * | 10/2001 | Goor | ................................ | 717/116 |
| 6,317,748 B1 * | 11/2001 | Menzies et al. | ........................... | 1/1 |
| 6,601,234 B1 * | 7/2003 | Bowman-Amuah | ............ | 717/116 |
| 6,658,425 B1 * | 12/2003 | Sluiman | ............................ | 707/781 |
| 6,721,777 B1 * | 4/2004 | Sharma | ............................ | 718/101 |
| 6,856,995 B1 * | 2/2005 | Ibitayo et al. | ..................... | 717/116 |
| 7,024,656 B1 * | 4/2006 | Ahad | .................................. | 717/116 |
| 7,152,090 B2 * | 12/2006 | Amirisetty et al. | ............. | 709/200 |
| 7,240,330 B2 * | 7/2007 | Fairweather | ..................... | 717/116 |
| 7,305,669 B2 * | 12/2007 | Roush | ............................... | 717/170 |
| 7,350,184 B2 * | 3/2008 | Upton | ............................... | 717/100 |
| 7,458,062 B2 * | 11/2008 | Coulthard et al. | .............. | 717/116 |
| 7,480,916 B2 * | 1/2009 | Beisiegel et al. | ................ | 719/311 |
| 7,506,342 B2 * | 3/2009 | Mousseau et al. | .............. | 719/320 |
| 7,546,579 B2 * | 6/2009 | Beust et al. | ....................... | 717/116 |
| 7,574,698 B2 * | 8/2009 | Kumar et al. | .................... | 717/116 |
| 7,577,934 B2 * | 8/2009 | Anonsen et al. | .................. | 717/116 |
| 7,617,479 B2 * | 11/2009 | Hambrick et al. | .............. | 717/106 |
| 7,653,651 B1 * | 1/2010 | Pavlov | ..................... | 707/999.103 |
| 7,694,315 B2 * | 4/2010 | Carter et al. | .................... | 719/328 |
| 7,711,740 B2 * | 5/2010 | Minore et al. | ................... | 717/106 |
| 7,739,290 B2 * | 6/2010 | Rossmann | ....................... | 717/116 |
| 7,752,639 B2 * | 7/2010 | Beisiegel et al. | ............... | 719/332 |
| 7,971,194 B1 * | 6/2011 | Gilboa | ............................. | 717/106 |

(Continued)

OTHER PUBLICATIONS

"Introduction to WebLogic Security", BEA Systems, Inc., available at "http://download.oracle.com/docs/cd/E13222_01/wls/docs61/programming.htm", 2001, p. 1-10.*

(Continued)

*Primary Examiner* — Thuy Dao
*Assistant Examiner* — Xi D Chen
(74) *Attorney, Agent, or Firm* — Mintz Levin Cohn Ferris Glovsky and Popeo, P.C.

(57) ABSTRACT

A method and an apparatus that execute executable codes to install a persistent object from a storage into an application server to access remote services in an EIS are described. The executable codes are based on relational properties for mapping an API (Application Programming Interface) function of an EIS to an object of a cross-platform connection framework coupling the EIS with the application server. The application server is enabled to access the API function of the EIS via the persistent object as part of the cross-platform connection framework.

18 Claims, 13 Drawing Sheets

U.S. PATENT DOCUMENTS

| | | | |
|---|---|---|---|
| 7,984,422 B2* | 7/2011 | Graham | 717/116 |
| 8,024,701 B2* | 9/2011 | Cote | 717/106 |
| 8,069,437 B2* | 11/2011 | Aigner et al. | 717/106 |
| 8,219,650 B2* | 7/2012 | Krasinskiy et al. | 717/106 |
| 8,225,271 B2* | 7/2012 | Eldridge et al. | 717/106 |
| 2002/0073396 A1* | 6/2002 | Crupi et al. | 717/116 |
| 2003/0074217 A1* | 4/2003 | Beisiegel et al. | 705/1 |
| 2003/0093470 A1* | 5/2003 | Upton | 709/203 |
| 2004/0177335 A1* | 9/2004 | Beisiegel et al. | 717/102 |
| 2006/0064667 A1* | 3/2006 | Freitas | 717/106 |

OTHER PUBLICATIONS

BEA WebLogic(TM) Server Version 6.1, "Programming with WebLogic RMI—IIOP", BEA Systems, Inc., available at "http://download.oracle.com/docs/cd/E13222_01/wls/docs61/programming.htm", Aug. 16, 2004, p. 1-52.*

BEA WebLogic(TM) Server Version 6.1, "Programming with WebLogic JINI", BEA Systems, Inc., available at "http://download.oracle.com/docs/cd/E13222_01/wls/docs61/programming.htm", Nov. 17, 2003, p. 1-28.*

BEA WebLogic(TM) Server Version 6.1, "Programming with WebLogic RMI", BEA Systems, Inc., available at "http://download.oracle.com/docs/cd/E13222_01/wls/docs61/programming.htm", Jun. 24, 2002, p. 1-40.*

BEA WebLogic(TM) Server Version 6.1, "Programming with WebLogic Tuxedo Connector", BEA Systems, Inc., available at "http://download.oracle.com/docs/cd/E13222_01/wls/docs61/programming.htm", Apr. 24, 2003, p. 1-74.*

BEA WebLogic(TM) Server Version 6.1, "WebLogic J2EE Connector Architecture", BEA Systems, Inc., available at "http://download.oracle.com/docs/cd/E13222_01/wls/docs61/programming.htm", Jun. 24, 2002, p. 1-113.*

"SAP JRA for Client Applications", SAP. Inc. Sap Help news letter, date unknown, available at "http://help.sap.com/saphelp_nw04/helpdata/en/12/5b84429069de54e10000000a155106/content.htm", p. 1-4.*

"Getting Started with SAP ABAP", SAP Developer Network News Letter, Uknown Date, available at "http://www.sdn.sap.com/irj/sdn/index?rid=/webcontent/uuid/90e7556d-ed76-2910-1592-b6af816225cc&prtmode=print", p. 1.*

"SAP NetWeaver", SAP Inc., 2003, available at "http://www.purdue.edu/onepurdue/about/documents/SAPNetWeaverbrochure_000.pdf", p. 1-8.*

Job Siegel, "OMG Overview: CORBA and OMA in Enterprise Computing", Oct. 1998, Communications of the ACM, pp. 37-43.*

Susan D. Urban, et al., "Interconnection of Distributed Components: An Overview of Current Middleware Solutions", Mar. 2001, J. Computer Science and Engineering, pp. 1-25.*

Matjaz B. Juric, et al., "Integrating Legacy Systems in Distributed Object Architecture", Mar. 2000, ACM SIGSOFT, Software Engineering Notes vol. 25 No. 2, pp. 35-39.*

Reverbel, Maccabe, "Making CORBA Objects Persistent: the Object Database Adapter Approach", Third USENIX Conference on Object-Oriented Technologies (COOTS), 1997; [retrieved on Jan. 26, 2012]; Retrieved from Internet <URL:http://citesserx.ist.psu.edu/viewdoc/download?doi=10.1.1.58.5146&rep=rep1&type=pdf>; pp. 1-11.*

Noseworthy, "IKE 2—Implementing the Stateful Distributed Object Paradigm", IEEE 2002; [retrieved on Jan. 26, 2012]; Retrieved from Internet <URL:http:ieeexplore.ieee.org/stamp/stamp.jsp?tp=&arnumber=1003659>; pp. 1-9.*

Al-Mansari, et al., "Orthogonal Persistence and AOP: a Balanceing Act", 2007, ACM; [retrieved on Dec. 20, 2012]; Retrieved from Internet <URL:http://dl.acm.org/citation.cfm?id=1233901>;pp. 1-7.*

Dimakis, et al., "Perceptive Middleware and Intelligent Agents Enhancing Service Autonomy in Smart Spaces", 2006,IEEE; [retrieved on Dec. 20, 2012]; Retrieved from Internet <URL:http://dl.acm.org/citation.cfm?id=1194541>;pp. 1-8.*

Liu, et al., "Kernel: A RDB-Based Object Persistence Component Set for Java", 2008, IEEE; [retrieved on Dec. 20, 2012]; Retrieved from Internet <URL:http://ieeexplore.ieee.org/stamp/stamp.jsp?tp=&arnumber=4722002>;pp. 64-67.*

Johnson, "J2EE Development Frameworks", 2005, IEEE; [retrieved on Dec. 20, 2012]; Retrieved from Internet <URL:http://ieeexplore.ieee.org/stamp/stamp.jsp?tp=&arnumber=1381270>;pp. 107-110.*

Java Persistent Objects—JDO State Transactions, Oct. 9, 2006.

Hibernate Reference Documentation, Version 3.1.1, downloaded from <http://www.caucho.com/resin-3.0/thirdparty/hibernate.xtp>; retrieved from the Internet on Sep. 28, 2006.

* cited by examiner

1.     customer_profile.properties for mapping JCO table to CustomerInfoTable

```
# The properties file for CustomerProfileDAO.
CLASS_NAME,CLASS=com.sap.a1s.bc.scoping.model.env.CustomerInfo
# AWID,JCO.TYPE_BYTE=id,STRING
# MANDT
# AWID
PROF_NAME,JCO.TYPE_CHAR=profileName,STRING
COMP_NAME,JCO.TYPE_CHAR=companyName,STRING
ADDR_STREET,JCO.TYPE_CHAR=companyStreet,STRING
ADDR_CITY,JCO.TYPE_CHAR=companyCity,STRING
ADDR_STATE,JCO.TYPE_CHAR=companyState,STRING
ADDR_CNTR,JCO.TYPE_CHAR=companyCountry,STRING
COMM_FAX,JCO.TYPE_CHAR=companyFax,STRING
COMM_PHONE,JCO.TYPE_CHAR=companyPhone,STRING
COMM_WEBSITE,JCO.TYPE_CHAR=companySite,STRING
CONT_FNAME,JCO.TYPE_CHAR=contactFirstName,STRING
CONT_LNAME,JCO.TYPE_CHAR=contactLastName,STRING
CONT_TITLE,JCO.TYPE_CHAR=contactTitle,STRING
CONT_POSITION,JCO.TYPE_CHAR=contactPosition,STRING
CONT_PHONE,JCO.TYPE_CHAR=contactPhone,STRING
CONT_FAX,JCO.TYPE_CHAR=contactFax,STRING
CONT_MOBILE,JCO.TYPE_CHAR=contactMobile,STRING
CONT_EMAIL,JCO.TYPE_CHAR=contactEMail,STRING
SAPCONT_FNAME,JCO.TYPE_CHAR=sapContactFirstName,STRING
SAPCONT_LNAME,JCO.TYPE_CHAR=sapContactLastName,STRING
SAPCONT_PHONE,JCO.TYPE_CHAR=sapContactPhone,STRING
SAPCONT_EMAIL,JCO.TYPE_CHAR=sapContactEmail,STRING
LASTCHANGEBY,JCO.TYPE_CHAR=lastSavedBy,STRING
LASTCHANGEON,JCO.TYPE_DATE=lastSavedOn,DATE
LASTCHANGEAT,JCO.TYPE_TIME=lastSavedAt,TIME
############
#Add a reference to connect JCO structure CustomerSurveyStruct.
S_CUSTOMER_SURVEY,JCO.STRUCT=customerSurvey,customersurvey.properties
```

2.     customersurvey.properties for mapping a JCO structure to CustomerSurveyStruct.

```
# The properties file for CustomerProfileDAO.
CLASS_NAME,CLASS= com.sap.a1s.bc.scoping.model.env.CustomerSurvey
MAIN_INDT,JCO.TYPE_CHAR=mainIndt,STRING
ANNU_REVN,JCO.TYPE_CHAR=annuRevn,STRING
NUM_EMPL,JCO.JCO.TYPE_CHAR=numEmpl,STRING
REASON_INQU,JCO.TYPE_CHAR=reasonInqu,STRING
CURR_SYSTEMS,JCO.TYPE_CHAR=currSystems,STRING
IMPL_BUDGET,JCO.TYPE_CHAR=implBudget,STRING
TIMEF_START,JCO.TYPE_CHAR=timefStart,STRING
TIMEF_GOLIVE,JCO.TYPE_CHAR=timefGolive,STRING
ES_NUM_USERS,JCO.JCO.TYPE_CHAR=esNumUsers,S
```

FIG. 5

```
#########################
#some information for connect to R3 Server ().
#do not change these attributes.
poolName=DAOPool
repositoryName=ABAPFunction
maxConnectionNum=5 pleases change these attribute by your current condition.
client=100
userId=ZHOUFR
passwd=Asdfghj1
language=en
appHostName=ldcia1s.wdf.sap.corp
systemNumber=29

################# some information for export file path and java package name.
The path of exporting java file.
exportPath=C:/Documents and Settings/i034152.SAP_ALL/Desktop/exp-dao/ the java package name of export java file.
packageName=com.sap.demo.dao

################# export ABAP functions name. if need export multi-ABAP functions, Pleases split them by the sign ",", then add them.
exportFuncName=/BCSE/FM_DTE_GET_DOMAIN_VALUES, /BCSE/FM_DTE_GET_CUSTM_PROF

```
/*
 *
 *
 * To change the template for this generated file go to
 * Window>Preferences>Java>Code Generation>Code and Comments
 */
package com.sap.demo.dao;

import java.util.ArrayList;
import java.util.Collection;
import java.util.Map;

import com.sap.mw.jco.JCO.Field;
import com.sap.mw.jco.JCO.Function;
import com.sap.mw.jco.JCO.Table;
import com.sap.mw.jco.JCO.Structure;
import com.sap.demo.dao.po.*;
import com.sap.demo.dao.util.DAOHelp;
import com.sap.demo.dao.util.ABAPConnection;
import com.sap.demo.dao.exception.DAOException;

/**
 * @author
 *
 * To change the template for this generated type comment go to
 * Window>Preferences>Java>Code Generation>Code and Comments
 */
public class FmDteGetDomainValuesDAO {            ← 701 private static Map etValuesMap = DAOHelp.getMapping(new
String[]{"FmDteGetDomainValuesEtValuesPO.properties"});

private static Map eReturnMap = DAOHelp.getMapping(new
String[]{"FmDteGetDomainValuesEReturnPO.properties"});

private ABAPConnection conn = null;

public void setConn (ABAPConnection conn) {
        this.conn = conn;
    }
```

FIG. 7A

```
/**
 *
 */
        public java.util.Collection fmDteGetDomainValues (String ivFieldname,String ivLangu,String
ivStructureName)
                throws DAOException {

Collection etValuesCol = new ArrayList();

Collection eReturnCol = new ArrayList();

try {

Function func = conn.createJCOFunction("/BCSE/FM_DTE_GET_DOMAIN_VALUES");
        //
        func.getImportParameterList().setValue(ivFieldname,"IV_FIELDNAME");
        //
        func.getImportParameterList().setValue(ivLangu,"IV_LANGU");
        //
        func.getImportParameterList().setValue(ivStructureName,"IV_STRUCTURE_NAME");
        conn.execute(func);
        //
        Table etValuesTab = func.getExportParameterList().
                    getTable("ET_VALUES");
        DAOHelp.copyPropertiesToBean(etValuesCol,
                    etValuesTab,
                    etValuesMap);
        //
        Table eReturnTab = func.getExportParameterList().
                    getTable("E_RETURN");
        DAOHelp.copyPropertiesToBean(eReturnCol,
                    eReturnTab,
                    eReturnMap);

Collection returnFuncValues = new ArrayList();
        returnFuncValues.add(etValuesCol);
        returnFuncValues.add(eReturnCol);
        return returnFuncValues;
        } catch (DAOException e) {
        throw e;
    }
  }
}
```

METHOD AND APPARATUS FOR PERSISTENT OBJECT TOOL

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates generally to enterprise computing. More particularly, this invention relates to a persistent object tool for mapping remote functions.

BACKGROUND

More and more businesses move to an e-business strategy to integrate their application servers with existing heterogeneous EISs' (Enterprise Information System). Recent advancements have provided unified architectures for components in an application server to access resources in an EIS. The J2EE (Java 2 Platform Enterprise Edition) Connector Architecture (JCA) is one such example. Usually, a software driver, such as SAP JRA (Java Resource Adaptor) can be plugged into the unified architecture to support the underlying EIS services, such as SAP ABAP (Advanced Business Application Programming) functions. Various services such as databases, enterprise business applications and messaging, etc. can be made available through a unified architecture based on different software drivers.

Typically, an application server uses access objects with a unified architecture to call remote functions in an EIS plugged in the unified architecture attached to the application server. Often times, software codes are executed in the application server to implement the access objects. Additionally, special objects may be required to map remote function parameters between the application server and the EIS.

However, the design and coding tasks may become burdensome when complicated data structures are involved to access EIS services from an application server through a unified architecture. Nested table structures from a remote function call are such examples. Coding in such a case is error prone and time consuming.

SUMMARY OF THE DESCRIPTION

Embodiments of the present invention include a method and apparatus that execute executable codes to install a persistent object from a storage into an application server to access remote services in an EIS. The executable codes are based on relational properties for mapping an API (Application Programming Interface) function of an EIS to an object of a cross-platform connection framework coupling the EIS with the application server. The application server is enabled to access the API function of the EIS via the persistent object as part of the cross-platform connection framework.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 is a sample file illustrating one embodiment of a mapping configuration for a persistent object tool.

FIG. 6 is a sample file illustrating one embodiment of a global configuration for a persistent object tool.

FIGS. 7A and 7B are sample executable codes generated according to one embodiment of a persistent object tool.

DETAILED DESCRIPTION

A method and an apparatus for a persistent object tool for an application server to access an API function in an EIS through a persistent object are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
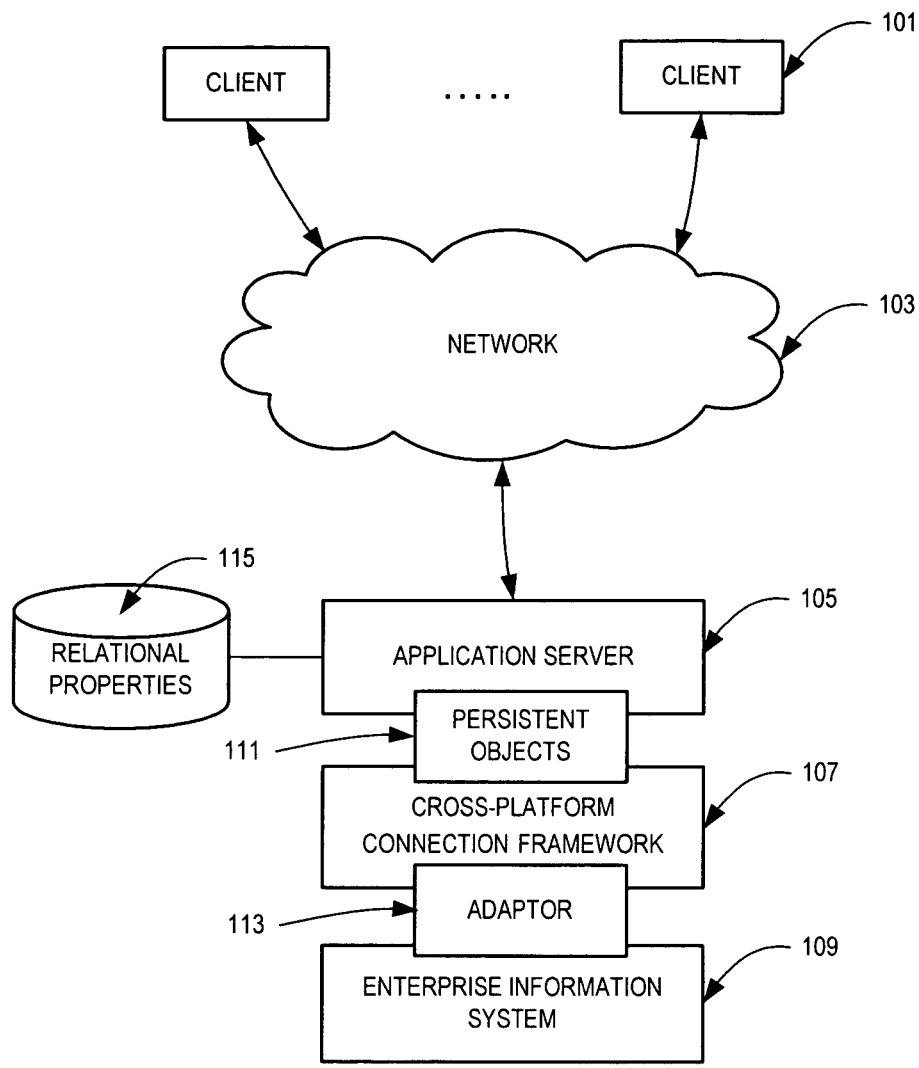
FIG. 1 is a block diagram illustrating one embodiment of a persistent object interfacing an application server with a cross-platform connection framework.

FIG. 1 is a block diagram illustrating one embodiment of a persistent object interfacing an application server with a cross-platform connection framework. In one embodiment, a client 101 is communicatively coupled to an application server through a network 103. A client 101 may be a browser based client or a business application client. The network 103 may be an internet or a corporate intranet. An application server 105 may be a server or a cluster of servers capable of handling business logic or data processes for requests from a client, such as NetWeaver™ system (available from SAP AG). An application server may be based on a J2EE platform. In one embodiment, one or more persistent objects 111 are installed between the application server 105 and a cross-platform connection framework 107 within the application server platform. A persistent object may include a data structure having a state. In one embodiment, a persistent object has the capability to rollback to its previous state when failing to complete a state transition function associated with the object. A persistent object may have a persistent field to store a value read from a data source which may be maintained in an EIS of an enterprise entity. A cross-platform connection framework 107 may be a software driver used to couple an application server platform to heterogeneous EISs', such as an ERP (Enterprise Resource Planning) system (for example those available from SAP AG), mainframe transaction processing system, database systems and/or legacy applications. Usually, a vendor of an EIS 109 may provide an adaptor 113 as a software plug-in or a software driver through the cross-platform framework 107 to couple the EIS 109 with the application server 105. Multiple adaptors may be pluggable into one single application server. In one embodiment, attributes associated with persistent objects 111 are based on relational properties 115 read into the application server 105 from a storage, such as a file or a database.

Figure 2:
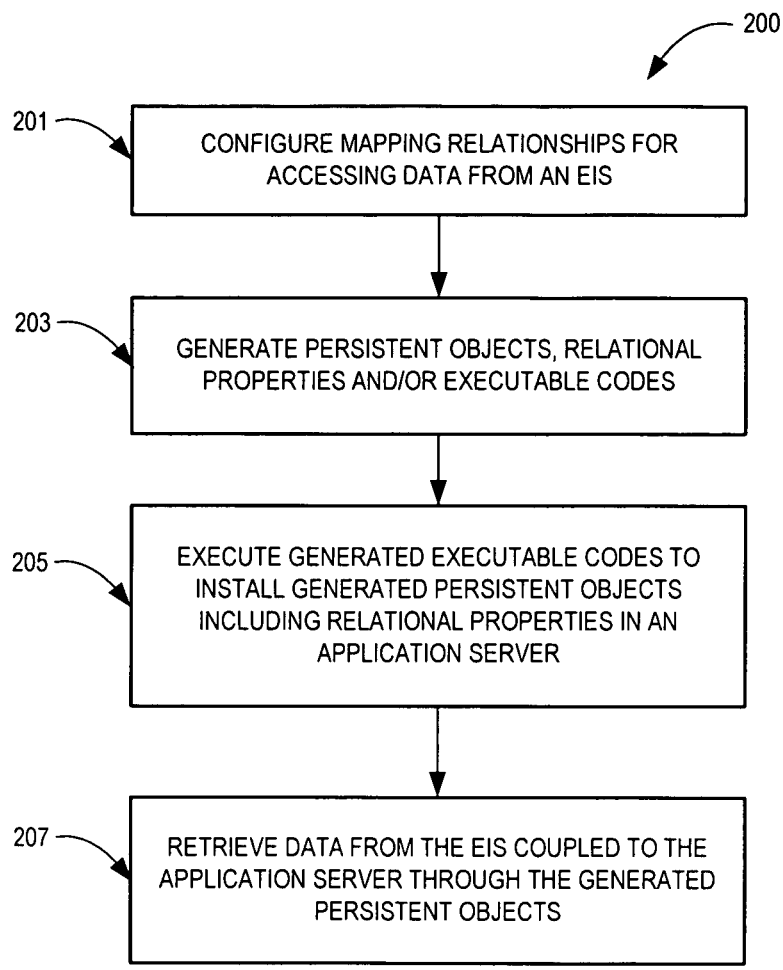
FIG. 2 is a flow diagram illustrating one embodiment of a process to operate a persistent object tool.

FIG. 2 is a flow diagram illustrating one embodiment of a process to operate a persistent object tool. For example, the processing logic may be performed by a system as shown in FIG. 1. In one embodiment, the processing logic includes, but is not limited to, installing a persistent object within an application server and accessing an API of an EIS coupled with the application server via the persistent object. The persistent object may be installed from a storage by executing executable codes based on relational properties for mapping the API function of the EIS to an object of a cross-platform connection framework coupling the EIS with the application server. The persistent object may be part of the cross-platform connection framework.

According to one embodiment, the processing logic configures mapping relationships at block 201 for accessing data from an EIS. A mapping relationship may define a correspondence between an attribute of an object and an element field of a function parameter. In one embodiment, the object is a Java compatible object. In one embodiment, the object is an SAP JCO (Java Connector) object. In one embodiment, the function is an API function provided by an EIS. In one embodiment, the function is an SAP ABAP (Advanced Business Application Programming) function. The function parameter may be an input and/or output parameter of the corresponding function. In one embodiment, an input/output parameter of an API function includes a table. In another embodiment, an input/output parameter of an API function includes a data structure. In one embodiment, a mapping relationship may connect one object with another object based on a function parameter of an API function.

At block 203, according to one embodiment, the processing logic generates a set of persistent objects, a set of relational properties, and/or a set of executable codes based on the mapping relationships configured at block 201. The generated persistent objects may be stored in an external storage, such as a file or a database. In one embodiment, a generated persistent object is a POJO (Plain Old Java Object). The generated persistent object may correspond to a table or a data structure of an API function in an EIS. In one embodiment, a generated persistent object corresponds to a structure of an API function in an EIS. The generated relational properties may be stored as a text file or a binary file. In one embodiment, a generated relational property is a mapping from a Java attribute to a field in a table or structure. The table or structure may represent APIs of an enterprise backend system. In one embodiment, the generated executable codes are based on Java. The generate executable codes may be based on Java DAO (Data Access Object).

At block 205, according to one embodiment, the processing logic executes the generated executable codes in an application server. The processing logic may install the generated persistent objects into an application server by reading the generated persistent objects from an external storage during the code execution at block 205. In one embodiment, the processing logic reads the relational properties into the application server during the code execution at block 205. The executable codes may have file path information to locate both the generated persistent objects and relational properties. In one embodiment, the generated executable codes, the generated persistent objects, and/or the generated relational properties are stored in separate files under a directory in an application server.

At block 207, according to one embodiment, the processing logic retrieves data from the EIS into the application server through the generated persistent objects. In one embodiment, the data is based on a table in the EIS. In another embodiment, the data is based on a structure in the EIS. The data may correspond to a parameter of an API function in the EIS. In one embodiment, the processing logic may convert between a persistent object and another business application object in an application server to retrieve the data. The business application object may be an object compatible with an enterprise application server.

Figure 3:
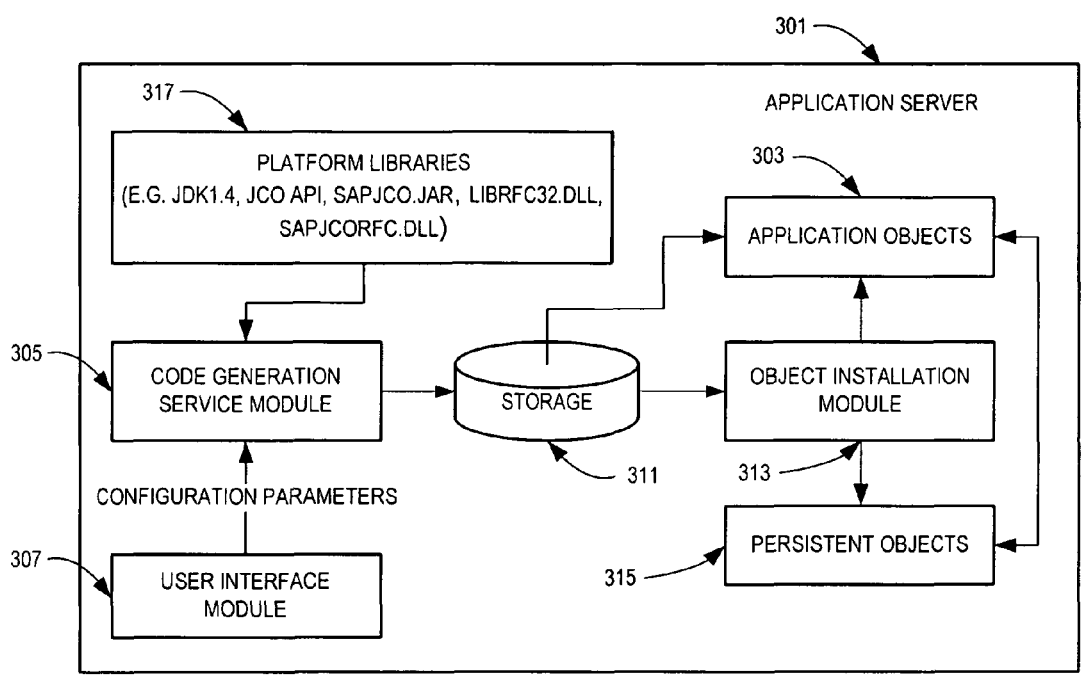
FIG. 3 is a block diagram illustrating one embodiment of a persistent object tool that generates persistent objects associated with application objects.

FIG. 3 is a block diagram illustrating one embodiment of a persistent object tool that generates persistent objects associated with application objects in an application server. In one embodiment, the system 301 includes, but is not limited to, a code generation service module 305 and an object installation module 313. The code generation service module 305 may generate executable codes, the executable codes being stored in a storage. The object installation module 313 may install a persistent object from the storage by executing the executable codes based on relational properties for mapping an API function of an EIS to an object of a cross-platform connection framework coupling with the EIS. The API of the EIS may be accessed via the persistent object as part of the cross-platform connection framework.

In one embodiment, a code generation service module 305 receives configuration parameters from a user interface module 307. A configuration parameter may be a mapping relationship different types of data. In one embodiment, the configuration parameters include a code output path name, a Java package name and a function list. The configuration parameters may specify user and system information such as user name, password and connection settings. In one embodiment, the code generation service module 305 depends on the services from platform libraries 317 in the application server 301 based on the configuration parameters. A platform library may be a Java runtime library.

In one embodiment, the code generation service generates persistent objects, executable codes and relation properties that are stored in the storage 311. The storage 311 may be a database or a set of files connected with the application server 301 locally or remotely. In one embodiment, a object installation module 313 retrieves executable codes from the storage 311 and executes the codes to create application objects 303 and install persistent objects 315 in the application server 301. The execution module may be associated with a batch file that includes script codes. An application object 303 may be associated with the relationship properties from the storage 311. In one embodiment, an application object 303 converts a persistent object 315 to a business application object based on platform libraries 317. In one embodiment, the application object 303 executes a business function in platform libraries 317 corresponding to an API function in an EIS connected with the application server 301 through the persistent objects 315. Note that some or all of the components as shown in FIG. 3 may be implemented in software, hardware, or a combination of both.

Figure 4:
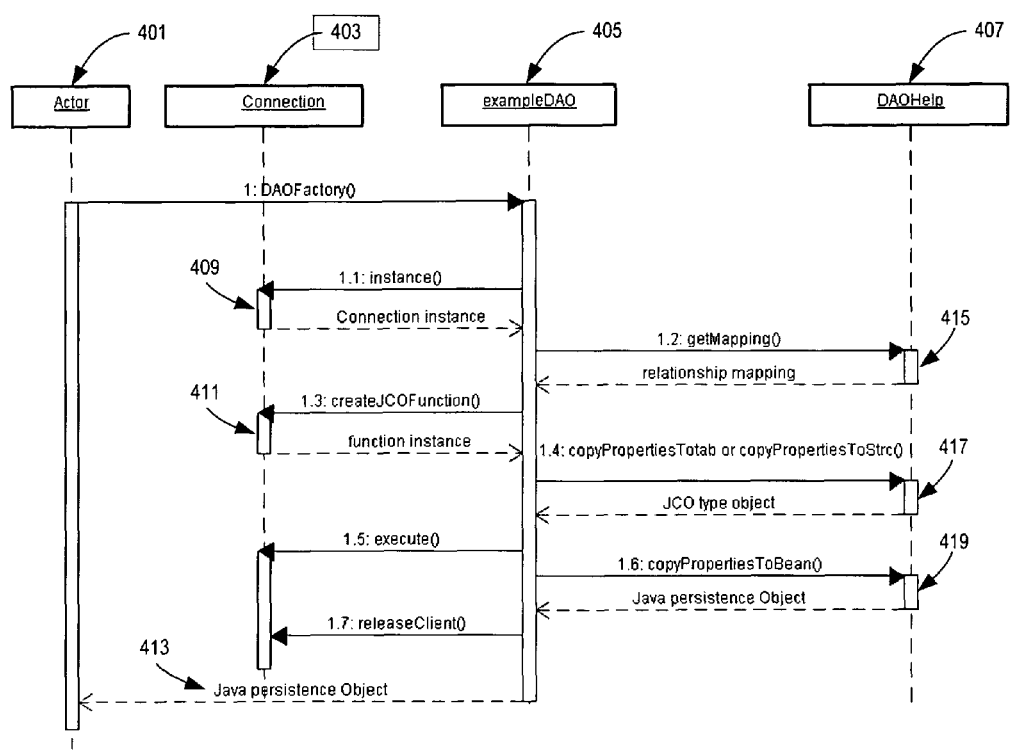
FIG. 4 is a timing diagram illustrating one embodiment of a process to access the service of an API function through a persistent tool.

FIG. 4 is a timing diagram illustrating one embodiment of a process to access the service of an API function through the persistent tool. Throughout this application ABAP of SAP is utilized as an example of an enterprise EIS. However, it is not so limited. Other EISs' may be applied. In one embodiment, an object Actor 401 in an application server creates an application object exampleDAO 405 based on a platform library. The object exampleDAO 405 may be a Java DAO object. In one embodiment, exampleDAO 405 makes a connection to an EIS through an object Connection 403. Connection 403 may be created through a platform library for JCO API during the time period 409. In one embodiment, an application object DAOHelp 407 reads relationship mappings during the time period 415. In one embodiment, DAOHelp 407 is an application object created according to the executable codes generated by a code generation service. The relationship mapping may be read from a file storing relationship properties generated by a code generation service.

During the time period 411, according to one embodiment, exampleDAO 405 activates an API function in the EIS through Connection 403. Connection 403 may provide a JCO function corresponding to the API function. In one embodiment, during the time period 417, DAOHelp 407 converts a persistent object to a JCO type object. A JCO type object may be a JCO table or a JCO structure. A JCO type object may be associated with input/output parameters of the API function. After calling the API function through exampleDAO 405, according to one embodiment, DAOHelp 407 converts a JCO object to a persistent object during the time period 419. Actor 401 may retrieve the persistent object 413 including the data from the EIS according to the API function.

FIG. 5 is a sample file illustrating one embodiment of a mapping configuration for a persistent object tool. In one embodiment, the mapping configuration defines a set of mapping relationships for a JCO table and a JCO structure. In one embodiment, the mapping configuration file is created through a text editor tool. In another embodiment, the mapping configuration is generated automatically by a user interface.

FIG. 6 is a sample file illustrating one embodiment of a configuration for a persistent object tool. In one embodiment, a global configuration includes destination paths 601 for the executable codes, the relationship properties, and the persistent objects to be generated. In another embodiment, the global configuration information is provided directly through a user interface.

FIGS. 7A and 7B are sample executable codes generated according to one embodiment of a persistent object tool. In this embodiment, two Java classes are defined in the generated codes. In one embodiment, the generated codes include a Java DAO class 701. In another embodiment, the generated codes include a Java collection class 703.

Figure 8A:
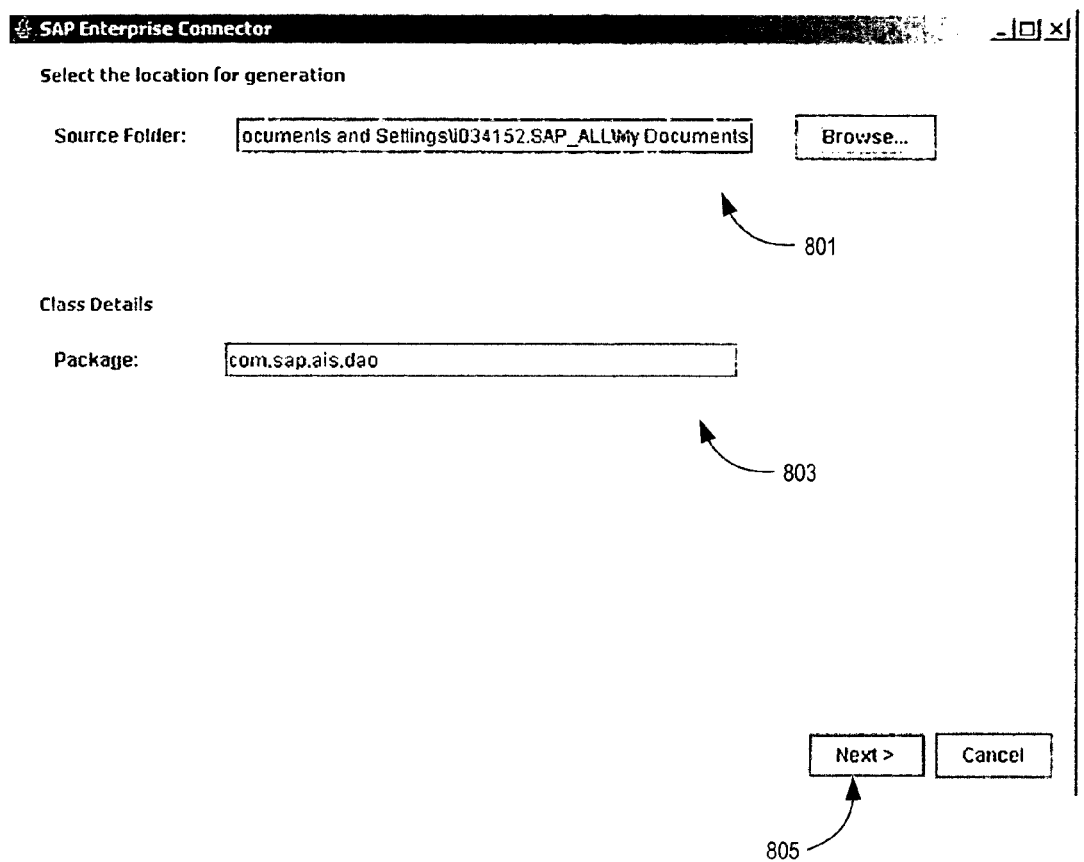
FIGS. 8A-8D are examples of user interfaces for one embodiment of a persistent object tool according to certain embodiments of the invention.
Figure 8B:
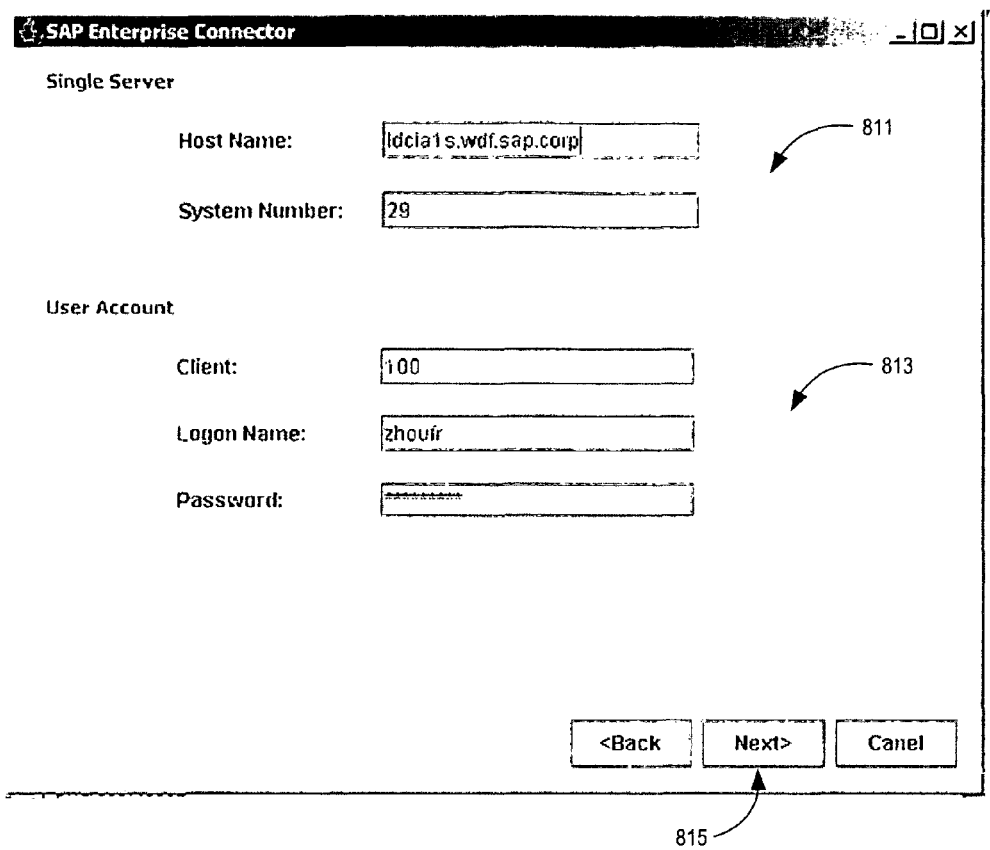
Figure 8C:
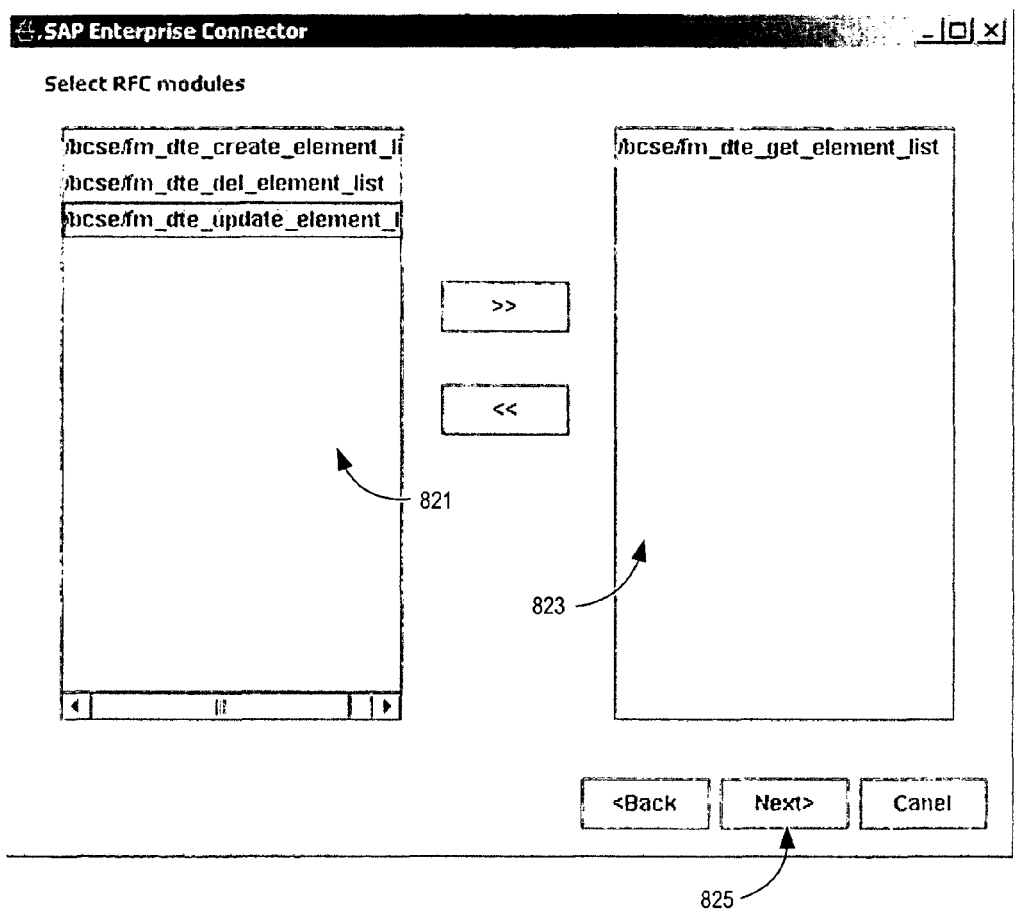
Figure 8D:
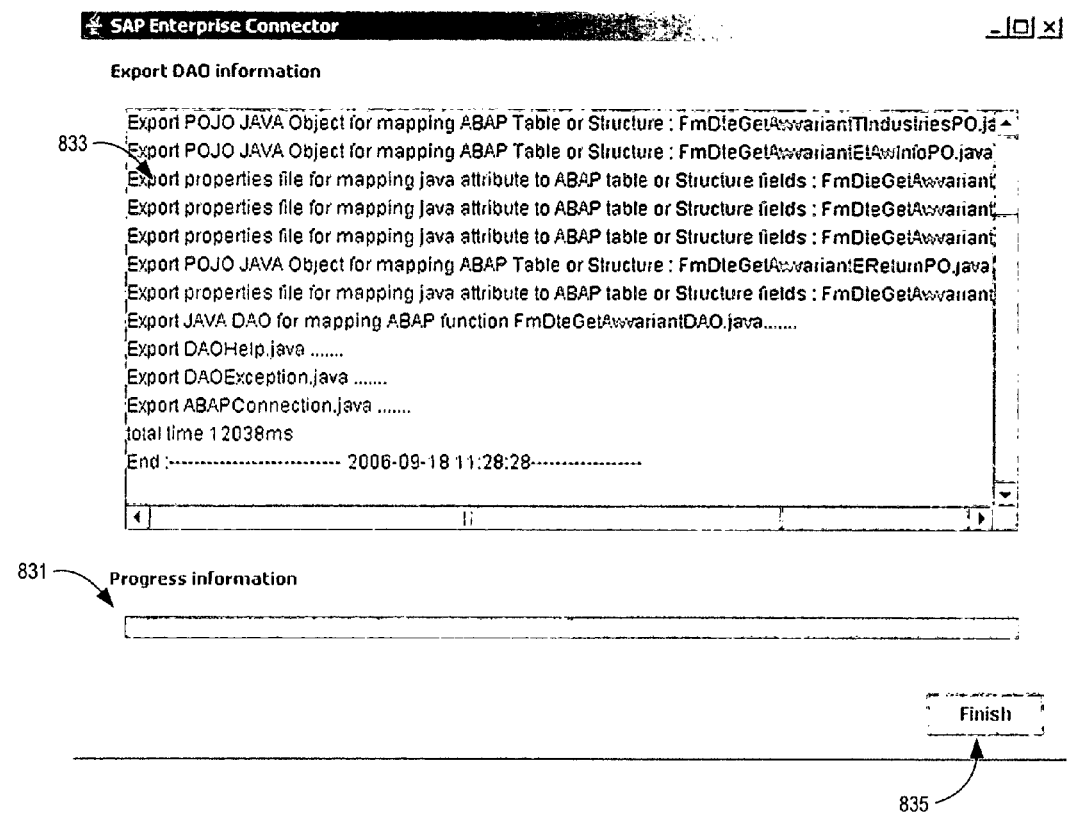

FIGS. 8A-8D are examples of user interfaces for installing one embodiment of a persistent object tool. FIGS. 8A, 8B, 8C and 8D may follow one another in order based on the user interface buttons 805 815 825. FIG. 8A illustrates a user interface, according to one embodiment, to input a source folder path 801 and a package name 803 for configuring a persistent object tool. A package name 803 may specify a class associated with an EIS. A source folder path 801 may determine where the persistent tool should store generated codes, objects and property files. Turning now to FIG. 8B, configuration settings for a target application server and information about the associated user account, according to one embodiment, are specified through the input forms 811 and 813 as shown in FIG. 8B. Proceeding with FIG. 8C, in one embodiment, RFC (Remote Function Call) modules are configured for the persistent object tool. The RFC modules corresponding to the class specified in FIG. 8A may be displayed in a selection window 821 to be selected into or removed from the tool at an adjacent selection window 823. After configuring the settings, according to one embodiment, a "Finish" button 835 may be clicked to run the code generation service of the persistence object tool as shown in FIG. 8D. In one embodiment, a progress bar 831 reports how far away from completing installing the persistent tool. Messages resulting from execution of code generation steps may be displayed in a text window 833. In this embodiment, the progress bar 831 indicates a current status of the code generation service corresponds to about half of the persistent tool installation task.

Figure 9:
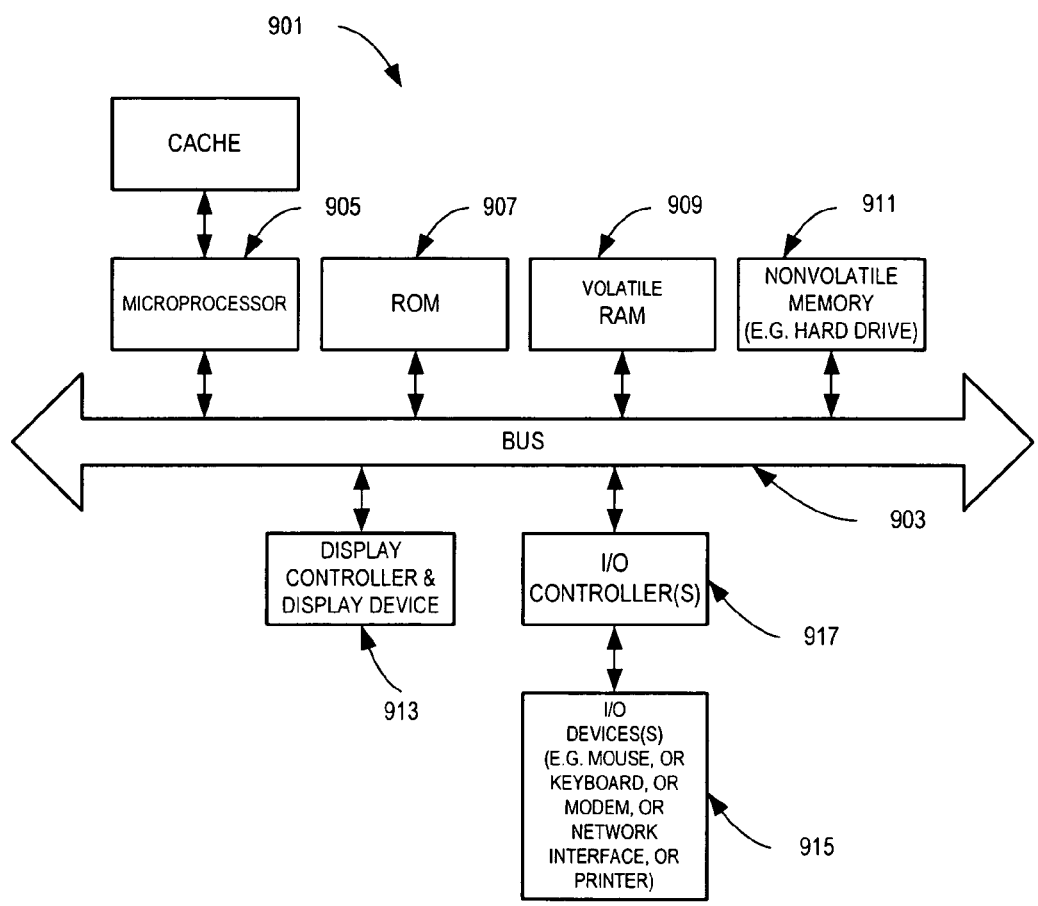
FIG. 9 illustrates one example of a computer system which may be used with an embodiment of the present invention.

FIG. 9 shows one example of a computer system 901 which may be used to implement an embodiment of the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 9, the computer system 901, which is a type of a data processing system, includes a bus 903 which is coupled to a microprocessor(s) 905 and a ROM (Read Only Memory) 907 and volatile RAM 909 and a non-volatile memory 1211. The microprocessor 903 may retrieve the instructions from the memories 907 909 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., .NET™ available from Microsoft Corporation, Mono, Java, Fusion™ available from Oracle Corporation, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In addition, the operations described above may be performed by an apparatus. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not specifically related to a particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the scope of the invention.

What is claimed is:

1. A computer implemented method comprising:

storing a configuration of at least one mapping relationship defining a correspondence between an attribute of an application programming interface (API) function of a heterogeneous enterprise information system (EIS) and an object of a cross-platform connection framework, the configuration comprising the at least one mapping relationship encoded in executable codes, the cross-platform connection framework comprising a software driver that couples the heterogeneous EIS with an application server;

executing the executable codes in the application server to thereby install a persistent object from a memory on or accessible to the application server, the persistent object being installed between the application server and the cross-platform connection framework, the persistent object corresponding to a first data structure in the application server and comprising a stateful second data structure that includes a persistent field;

configuring a parameter for a code generation service, the parameter mapping a first element type of the API function to a second element type within the stateful second data structure of the persistent object; and accessing the API of the EIS via the persistent object, the accessing comprising storing, in the persistent field of the persistent object, a value of a data element generated by activation of the API function, and retrieving the value of the data element from the persistent field of the persistent object for use by the application server.

2. The method of claim 1, wherein the persistent object is generated by the code generation service.

3. The method of claim 1, wherein the at least one mapping relationship is generated by the code generation service.

4. The method of claim 1, wherein the executable codes are generated by the code generation service.

5. The method of claim 1, further comprising: generating the object in the cross-platform connection framework.

6. The method of claim 1, wherein the data element includes the first element type in the EIS and wherein the data element includes the second element type in the cross-platform connection framework.

7. The method of claim 1, wherein the data structure is a table.

8. The method of claim 1, further comprising: rolling back the persistent object to a previous state in response to detecting that a state transition function associated with the object has failed to complete.

9. A machine-readable medium non-transitorily storing instructions, which when executed by a machine, cause the machine to perform operations comprising:
  storing a configuration of at least one mapping relationship defining a correspondence between an attribute of an application programming interface (API) function of a heterogeneous enterprise information system (EIS) and an object of a cross-platform connection framework, the configuration comprising the at least one mapping relationship encoded in executable codes, the cross-platform connection framework comprising a software driver that couples the heterogeneous EIS with an application server;
  executing the executable codes in the application server to thereby install a persistent object from a memory on or accessible to the application server, the persistent object being installed between the application server and the cross-platform connection framework, the persistent object corresponding to a first data structure in the application server and comprising a stateful second data structure that includes a persistent field;
  configuring a parameter for a code generation service, the parameter mapping a first element type of the API function to a second element type within the stateful second data structure of the persistent object; and
  accessing the API of the EIS via the persistent object, the accessing comprising storing, in the persistent field of the persistent object, a value of a data element generated by activation of the API function, and retrieving the value of the data element from the persistent field of the persistent object for use by the application server.

10. The machine-readable medium of claim 9, wherein the persistent object is generated by the code generation service.

11. The machine-readable medium of claim 9, wherein the plurality of relational properties are generated by the code generation service.

12. The machine-readable medium of claim 9, wherein the executable codes are generated by the code generation service.

13. The machine-readable medium of claim 9, wherein the method further comprises: generating the object in the cross-platform connection framework.

14. The machine-readable medium of claim 9, wherein the data element includes the first element type in the EIS and wherein the data element includes the second element type in the cross-platform connection framework.

15. The machine-readable medium of claim 9, wherein the data structure is a table.

16. The machine-readable medium of claim 9, wherein the operations further comprise: rolling back the persistent object to a previous state in response to detecting that a state transition function associated with the object has failed to complete.

17. A data processing system, comprising:
  at least one processor; and
  a machine-readable medium storing instructions, which when executed by the at least one processor, cause the at least one processor to perform operations comprising:
  storing a configuration of at least one mapping relationship defining a correspondence between an attribute of an application programming interface (API) function of a heterogeneous enterprise information system (EIS) and an object of a cross-platform connection framework, the configuration comprising the at least one mapping relationship encoded in executable codes, the cross-platform connection framework comprising a software driver that couples the heterogeneous EIS with an application server;
  executing the executable codes in the application server to thereby install a persistent object from a memory on or accessible to the application server, the persistent object being installed between the application server and the cross-platform connection framework, the persistent object corresponding to a first data structure in the application server and comprising a stateful second data structure that includes a persistent field;
  configuring a parameter for a code generation service, the parameter mapping a first element type of the API function to a second element type within the stateful second data structure of the persistent object; and
  accessing the API of the EIS via the persistent object, the accessing comprising storing, in the persistent field of the persistent object, a value of a data element generated by activation of the API function, and retrieving the value of the data element from the persistent field of the persistent object for use by the application server.

18. The data processing system of claim 17, wherein the operations further comprise: rolling back the persistent object to a previous state in response to detecting that a state transition function associated with the object has failed to complete.

* * * * *